United States Patent [19]

Sato

[11] 4,156,259

[45] May 22, 1979

[54] TAPE RECORDER IN WHICH A CASSETTE TAPE AND A CARD ARE CO-USED

[75] Inventor: Masaaki Sato, Hachioji, Japan

[73] Assignee: Olympus Optical Company, Tokyo, Japan

[21] Appl. No.: 850,673

[22] Filed: Nov. 11, 1977

[30] Foreign Application Priority Data

| Nov. 12, 1976 | [JP] | Japan | 51-136065 |
| Nov. 12, 1976 | [JP] | Japan | 51-136066 |
| Nov. 12, 1976 | [JP] | Japan | 51-136067 |
| Nov. 12, 1976 | [JP] | Japan | 51-136068 |
| Nov. 12, 1976 | [JP] | Japan | 51-136069 |
| Dec. 11, 1976 | [JP] | Japan | 51-149248 |
| Dec. 11, 1976 | [JP] | Japan | 51-149249 |
| Dec. 11, 1976 | [JP] | Japan | 51-149250 |
| Dec. 11, 1976 | [JP] | Japan | 51-149251 |

[51] Int. Cl.² ............... G11B 15/60; G11B 25/04; G11B 25/06
[52] U.S. Cl. ........................... 360/94; 360/2; 360/88
[58] Field of Search ............ 360/94, 88, 2, 96, 130, 360/134; 35/35 C; 235/61.11 D

[56] References Cited

U.S. PATENT DOCUMENTS

| 3,584,882 | 6/1971 | Krtous et al. | 360/94 |
| 3,610,635 | 10/1971 | Schriff et al. | 360/94 |
| 3,678,212 | 8/1972 | Wild | 360/2 |
| 3,800,315 | 3/1974 | Budrose | 360/94 |
| 3,831,199 | 8/1974 | Vollum et al. | 360/94 |
| 3,852,817 | 12/1974 | Budrose | 360/2 |
| 3,975,767 | 8/1976 | Budrose | 360/94 |
| 4,027,405 | 6/1977 | Schloss | 360/2 |

*Primary Examiner*—Alfred H. Eddleman
*Attorney, Agent, or Firm*—Toren, McGeady and Stanger

[57] ABSTRACT

A tape recorder in which a cassette tape and a magnetic card are co-used. The tape recorder comprises an electrical means for recording and reproducing informations, a cassette chamber for charging a cassette tape therein, and a running guide for guiding a magnetic card. The running guide is provided in the cassette chamber. The magnetic card is run along the running guide so as to slidably touch with a magnetic head.

8 Claims, 32 Drawing Figures

TAPE RECORDER IN WHICH A CASSETTE TAPE AND A CARD ARE CO-USED

BACKGROUND OF THE INVENTION

The present invention relates to a tape recorder which also serves as a card reader.

A magnetic card has recently been considered as linguistic education for infants. Such magnetic card is made by printing letters and pictures corresponding to the content of a tape on a card surface having a magnetic tape adhered thereto. An effect of this arrangement is that a song and a simple conversation can be understood by looking at the letters and the pictures.

Such magnetic tape, however, requires an exclusive card reader for reproducing the content of a tape.

On the other hand, the demand for tape recorders for exercising linguistics such as English conversation and the like has recently increased.

Therefore, when both the above-mentioned magnetic card and the tape recorder are needed, a card reader should be purchased separately from the tape recorder, which is quite expensive for users.

SUMMARY OF THE INVENTION

An object of the present invention is to meet the above requirements.

Another object of the present invention is to provide a tape recorder which can also be used as a card reader of a magnetic card. According to a feature of the invention, these objects are attained in whole or in part, by providing a running guide to guide a magnetic card in a cassette chamber.

These and other features of the invention are pointed out in the claims. Other objects and advantages of the invention will become evident from the following detailed description when read in light of the accompanying drawings.

BRIEF DESCRIPTION OF PREFERRED EMBODIMENTS

Figure 1:
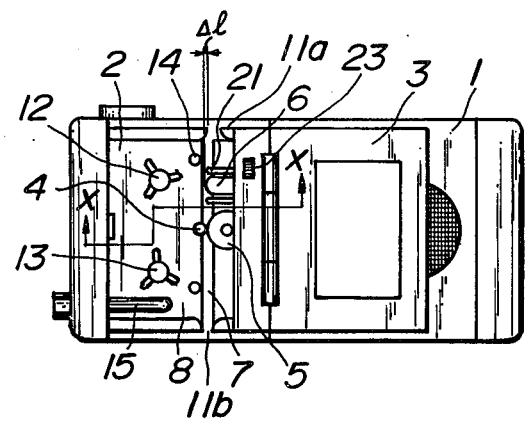
FIGS. 1 and 2 show a plan view and a side view exhibiting one embodiment of a tape recorder according to the present invention.
Figure 2:
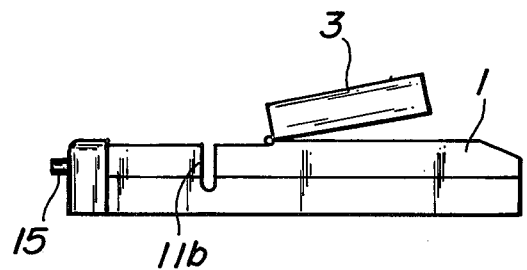
Figure 3:
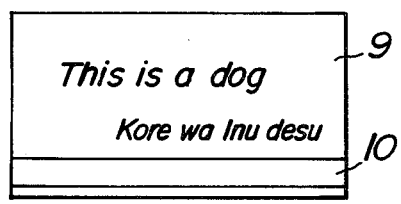
FIG. 3 is a front view showing a magnetic card used in the same embodiment.

Referring to FIGS. 1 and 2, one embodiment of a tape recorder according to the present invention is shown. Reference numeral 1 is a tape recorder body, and this tape recorder body 1 is provided with a cassette chamber 2 for charging a cassette tape (not shown). An opening of this cassette chamber 2 is provided with a lid 3. In the cassette chamber 2, are provided a capstan shaft 4 for running and driving a tape, a pinch roller 5 which freely moves front and rear by interlocking with a reproducing button (not shown) to the shaft 4, and a magnetic head 6. (In the illustrated embodiment, there is shown the reproducing state by engaging the pinch roller 5 to the capstan shaft 4). At a bottom portion of the cassette chamber 2 is provided a bottom plate 8. The bottom plate 8 is provided with a guide groove 7 along the widthwise direction. The guide groove 7 is for guiding running of a magnetic card 9, and when under the above-mentioned reproducing stage, the magnetic card 9 passes along the end of the magnetic head 6 and between the capstan shaft 4 and the pinch roller 5. The guide groove 7 is slightly larger than the thickness of the card 9 in its width. The magnetic card 9 is printed with, for instance, letters at the center as shown in FIG. 3, and a magnetic tape 10 with a conversation recorded thereon and the like relating to said letters is attached along the lower peripheral edge.

Side walls of the cassette chamber 2 on both ends of the guide groove 7 are provided with slits 11a and 11b for inserting and releasing the magnetic card 9. The slit 11a at the inserting side of the magnetic card 9 is shifted by Δl inside from the end of the head 6 when the magnetic head 6 is moved forward as illustrated.

Reference numerals 12 and 13 are a take-up shaft and a feed shaft of the cassette tape (not shown), respectively, numeral 14 is a guide pin for guiding the position of the same cassette, and numeral 15 is an eject button of the cassette.

As a tape recorder, it is most important to precisely engage a running tape to a magnetic head surface for carrying out recording and reproduction of good quality. Therefore, in this kind of tape recorders, a pair of tape guides are provided so as to slightly project from the end of the magnetic head at both sides of the magnetic head, and the tape is correctly run by these tape guides and then the tape positively passes on the head surface.

Accordingly, if the above-mentioned magnetic card is used with such construction as it is, the tape guides naturally become an obstacle and it becomes impossible to engage the tape surface of the magnetic card to the magnetic head.

Figure 4A:
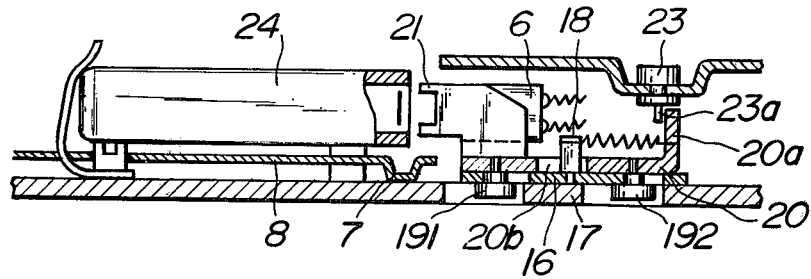
FIGS. 4a and 4b are cross-sections taken on line X—X in FIG. 1 when using the cassette tape and the magnetic card respectively.
Figure 4B:
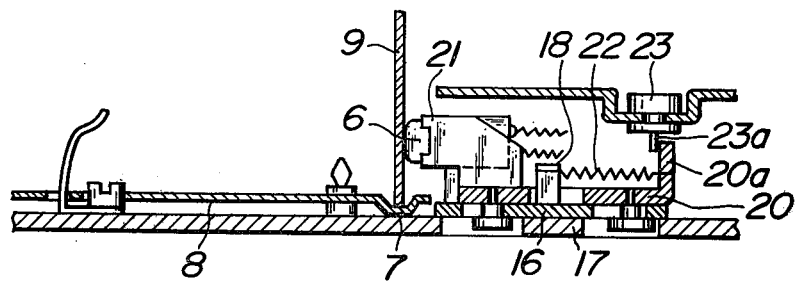
Figure 5:
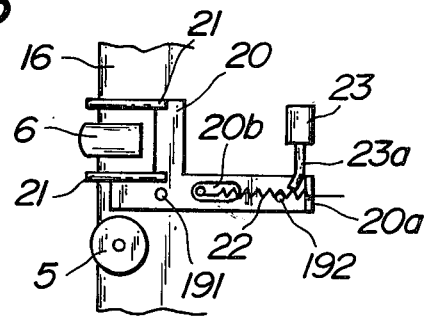
FIG. 5 is a plan view showing the essential part of the same embodiment.

In order to solve such problem, the present embodiment is constructed as shown in FIGS. 4a, 4b and 5. FIGS. 4a and 4b are cross-sections taken on line X—X in FIG. 1. In FIGS. 4a and 4b, reference numeral 16 is a lever moved in both directions as illustrated along a chassis 17 of the tape recorder body 1 by interlocking with a reproducing button (not shown), the lever 16 is provided with the above-mentioned pinch roller 5 and the magnetic head 6, and also planted a pin 18 at the center of the lever plate surface. Further, on the lever 16 is provided a tape guide plate 20 freely movable along the moving direction. In this case, the tape guide plate 20 is planted with guide pins 191, 192 on the lower plate surface so as to freely move on the lever 16 by means of these pins 191, 192. The tape guide plate 20 is also placed on both sides of the magnetic head 6 at one end as shown in FIG. 5 so as to provide the above-mentioned tape guides 21, 21, and formed a projection 20a at the other end, and at the center of the plate surface is provided a long hole 20b passes therethrough said pin 18 in the moving direction of the guide plate 20. Between the projection 20a and the pin 18 is provided a spring 22, the whole guide plate 20 is biased by the spring 6 in the left direction as illustrated, so as to slightly project the tape guide 21 from the end of the head 6.

On the other hand, returning to FIG. 1, near the cassette chamber 2 of the tape recorder body 1 is provided a switching knob 23. The switching knob 23 is switched in accordance with the use of a cassette tape or a magnetic card, and this switching is carried out by sliding operation.

Further, the switching knob 23, as shown in FIG. 5, is provided with a projection 23a which end is bent in the shape of J. This projection 23a is engaged to the projection 20a of the said tape guide plate 20 when the switching knob 23 is switched to the side of using the magnetic card and the position of the tape guide plate 20 is limited by the bent portion 23a.

In such construction, when using a cassette tape, the switching knob 23 is switched to the side of using a cassette tape. If a reproducing button (not shown) is operated in such state, the lever 16 interlocked therewith is moved in the left direction as illustrated along the chassis 17, and the pinch roller 5 and the magnetic head 6 are set at the reproducing position. When the lever 16 is moved to the left direction as illustrated, the tape guide plate 20 is moved to the left direction as illustrated together with the lever 16 by biased force of the spring 22. Accordingly, in this state, as shown in FIG. 4a, the end portion of the tape guide 21 is slightly projected from the end of the magnetic head 6. Thus, the tape of the cassette tape 24 is defined by the tape guide 21 and positively run on the surface of the magnetic head 6.

Figure 6:
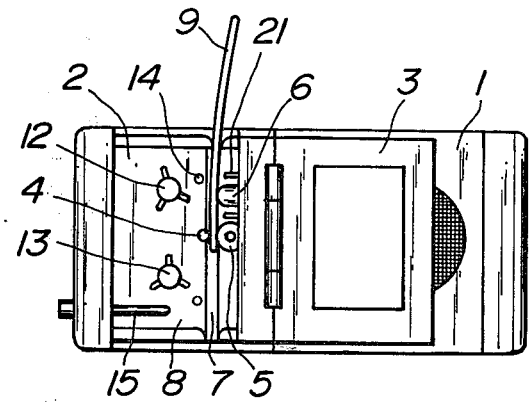
FIG. 6 is a plan view for explaining the action as a card reader of the same embodiment.

When using the magnetic card, the switching knob 23 is switched to the side of using the magnetic card. Then, in this state, the projection 23a of the switching knob 23 is engaged to the projection 20a of the tape guide plate 20 and movement of the tape guide plate 20 is limited. Accordingly, if the reproducing button (not shown) is operated thereafter, the lever 16 interlocked therewith is moved to the right direction as illustrated along the chassis 17, and the pinch roller 5 and the magnetic head 6 are set at the reproducing position. In this case, however, the tape guide plate 20 is limited by the projection 23a of the switching knob 23 as described above, so that it does not follow the lever 16. The tape guide 21 is then set at the position slightly retreated from the end of the magnetic head 6 as shown in FIG. 4b. In this state, as shown in FIG. 6, if the magnetic card 9 is fed from the inserting slit 11a along the guide groove 7 and its end is slightly inserted between the capstan shaft 4 and the pinch roller 5, the card 9 is run and driven by the capstan shaft 4 and fed to the other slit 11b along the guide groove 7, but in this case, the magnetic card 9 is positively engaged to the magnetic head 6 without any obstacle of the tape guide 21. Further, since the slit 11a and the magnetic head 6 are shifted by $\Delta l$, the magnetic card 9 is bent (curved) as illustrated, and in this case, if the length of the magnetic card 9 in the running direction is made longer than the distance between the slits 11a and 11b, the start end of the magnetic card reaches the slit 11b before the final end thereof passes through the slit 11a, so that the card can stably be run.

Further, as shown in FIG. 4b, in order to change the pinch roller 5 and the magnetic head 6 from the state of setting at the reproducing position to the state of using the magnetic card, when the switching knob 23 is switched to the side of using the magnetic card, the projection 20a of the tape guide plate 20 is engaged to the bent portion of the projection 23a. Then, the tape guide plate 20 is moved to the right direction as illustrated by said bent portion. As a result, the tape guide 21 is slightly retreated from the end of the magnetic head 6 as shown in FIG. 4b, so that as described above, the magnetic card 9 can be used thereafter.

According to the present invention, in accordance with switching of the switching knob, the tape guide can be set at the position slightly projected or retreated from the end of the magnetic head, so that not only recording and reproduction as a prior tape recorder but also reproduction of a magnetic card as a card reader can be performed, thereby eliminating any purchase of a card reader, and as a result, an economical burden for users can be mitigated by a large margin.

Figure 7A:
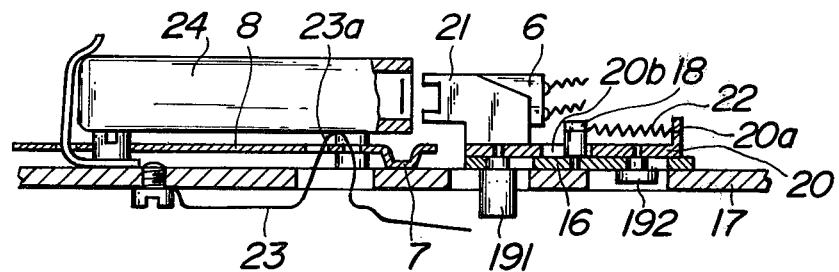
FIGS. 7a and 7b are cross-sections showing an embodiment of the present invention for controlling the position of a tape guide by a spring plate.
Figure 7B:
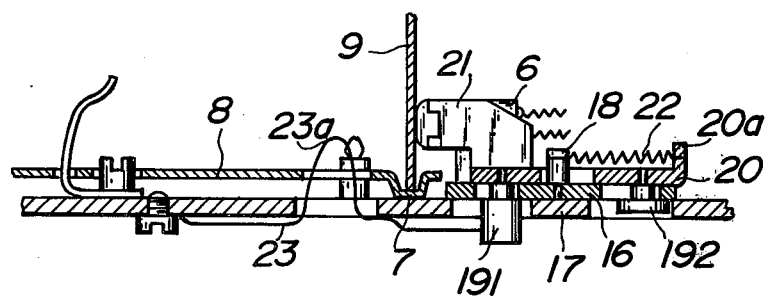
Figure 8:
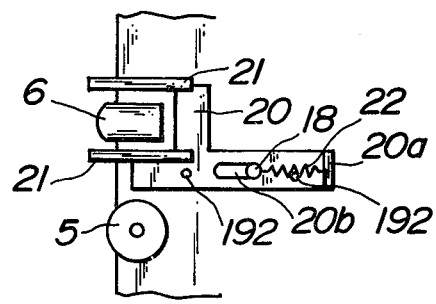
FIG. 8 is a plan view showing the essential part of the same embodiment.

Embodiments shown in FIGS. 7a, 7b and 8 control the position of the tape guide 21 by means of the spring plate 23. In these figures, like numerals corresponding to FIGS. 1–6 are used and explanation thereof is omitted.

As shown, on the lower surface of the chassis 17 is secured one end of the spring plate 23. This spring plate 23 is formed as a curved portion 23a on the midway, and this curved portion 23a is constantly projected in the cassette chamber 2 and its end is engaged to the guide pin 191. That is, as shown in FIG. 7b, under the state of charging no cassette tape, the curved portion 23a is projected in the cassette chamber 2, its end is engaged to the guide pin 191, movement of the tape guide plate 20 to the left direction as illustrated is limited, and as shown in FIG. 7a, when the cassette tape 24 is charged, the curved portion 23a is pressed downwardly, its end is separated from the guide pin 191, and movement of the tape guide plate 20 to the left direction as illustrated is not limited.

Accordingly, if the reproducing button is operated under such state, the lever 16 is moved in the left direction as illustrated along the chassis 17 so as to set the pinch roller 5 and the magnetic head 6 at the reproducing position. If the lever 16 is moved to the left direction as illustrated, the tape guide plate 20 is moved to the left direction as illustrated together with the lever 16 by biased force of the spring 22. Therefore, under this state, as shown in FIG. 7a, the tape guide 21 is slightly projected from the end of the magnetic head 6. As a result, the tape of the cassette tape 24 can be defined by the tape guide 21 and positively run on the surface of the magnetic head 6.

In case of using the magnetic card, as shown in FIG. 7b, no cassette tape is charged in the cassette chamber 2 and under this state, the curved portion 23a of the spring plate 23 is projected in the cassette chamber 2 and its end is attached to the guide pin 191 so as to limit movement of the tape guide plate 20 to the left direction as illustrated. Accordingly, if the reproducing button (not shown) is operated thereafter, the lever 16 interlocked therewith is moved to the right direction as illustrated along the chassis 17, and the pinch roller 5 and the magnetic head 6 are set at the reproducing position. In this case, however, the tape guide plate 20 is limited by the end of the spring plate 23 as described above, so that it does not follow movement of the lever 16. As a result, the tape guide 21 is set at the position slightly retreated from the end of the magnetic head 6. Accordingly, when the magnetic card 9 is fed from the inserting side slit 11a along the guide groove 7 under this state and its end is slightly inserted between the capstan shaft 4 and the pinch roller 5, the card 9 is run and driven by the capstan shaft 4 thereafter and fed to the other slip 11b along the guide groove 7. Thus, the magnetic card 9 is positively engaged to the magnetic head 6 without any obstacle of the tape guide 21.

Figure 9A:
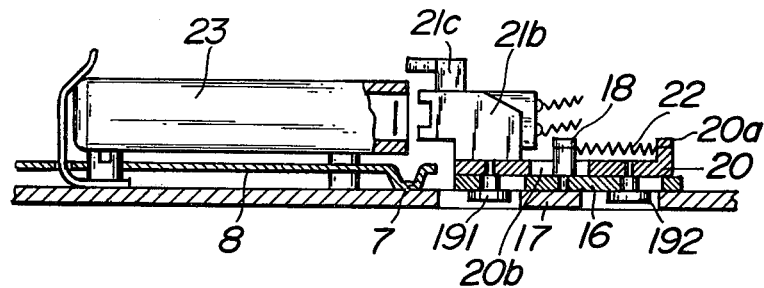
FIGS. 9a and 9b are cross-sections showing an embodiment of detecting the presence of the magnetic card by the guide plate and switching the position of the tape guide.

Embodiments shown in FIGS. 9a, 9b, 10 and 11 are to detect the presence of the magnetic card by means of the guide plate and to switch the position of the tape guide. That is, on the upper side end of one tape guide 21a in tape guides 21a, 21b provided on the tape guide plate 20 is integrally provided an L-shaped tongue 21c. This tongue 21c is formed into a taper at the end as apparent from FIG. 11, and this end is further projected from the tape guides 21a, 21b. Further, in this case, the tongue 21c is positioned upwards the cassette tape 23 when it is charged as shown in FIG. 9a.

In this construction, in case of using the cassette tape, the cassette tape 23 is charged in the cassette chamber 2 as shown in FIG. 9a.

Under this state, ends of the tape guides 21a, 21b are slightly projected from the end of the magnetic head 6 and the end of the tongue 21c is further projected forwards from the tape guide 21a, but as shown in the figure, there is no influence because it is positioned upwards the cassette tape 23. Thus, the running position of the tape of the cassette tape 23 is defined by the tape guides 21a, 21b and positively run on the surface of the magnetic head 6.

Figure 9B:
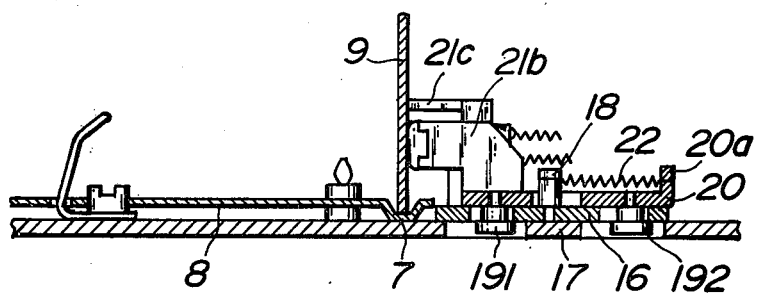
Figure 10:
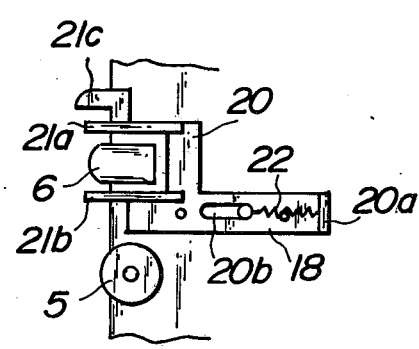
FIG. 10 is a plan view showing the essential part of the same embodiment.
Figure 11:
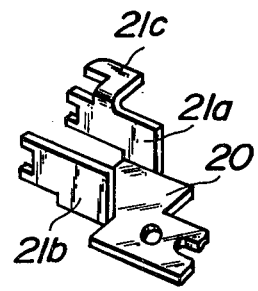
FIG. 11 is a perspective view showing the tape guide portion used in the same embodiment.

In case of using the magnetic card, as shown in FIG. 9b, if the magnetic card 9 is fed from the inserting slit 11a along the guide groove 7, the tongue 21c is pressed by the plate surface of the magnetic card 9. Thus, the tape guide plate 20 is moved to the right direction as illustrated against biased force of the spring 22, so that the tape guides 21a, 21b are positioned by slightly retreating from the end of the magnetic head 6. Accordingly, if the end of the magnetic card 9 is slightly inserted between the capstan shaft 4 and the pinch roller 5 from this state, the card 9 is run and driven by the capstan shaft 4 thereafter and fed to the other slit 11b along the guide groove 7. Thus, the card is positively engaged to the magnetic head 6 without any obstacle of the tape guides 21a and 21b.

Figure 12:
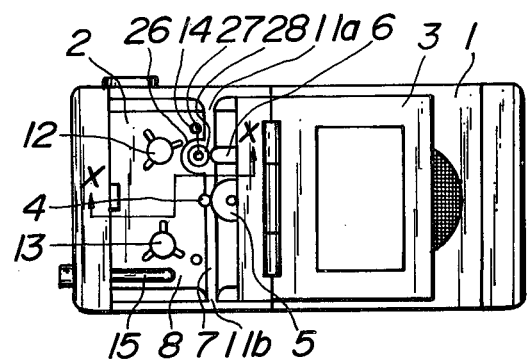
FIG. 12 is a plan view showing an embodiment of providing a press member for pressing the magnetic card to the magnetic head.

There is explained an embodiment provided with a press member for pressing the magnetic card to the magnetic head with reference to FIGS. 12 and 13.

Figure 13A:
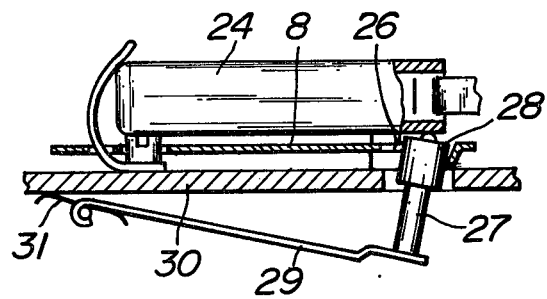
FIGS. 13a and 13b are cross sections taken on line X—X in FIG. 1, when using the cassette tape and the magnetic tape respectively.

As shown in these figures, the bottom plate 8 is passed through the bottom portion of the cassette chamber 2 and a through-hole 26 is formed. A press metal 27 of a magnetic card is provided through this through-hole 26. This press metal 27 is provided with a soft pad roller 28 such as foamed sponge and the like at the end, and the magnetic card 9 is pressed to the magnetic head 6 with a predetermined pressure by resilience of the pad roller 28 itself. Further, this press metal 27 is fixed to one end of the lever 29. This lever 29 is pivoted to the bottom chassis 30 of the cassette chamber 2 at the other end. At the pivoted portion of the lever 29 is interposed a spring 31 for constantly biasing the lever 29 in the anticlockwise direction and the press metal 27 is vertically positioned in the cassette chamber 2. When the cassette tape 24 is charged as shown in FIG. 13a and the press metal 27 is pressed from the upper portion, the lever 29 is pivoted in the clockwise direction and the press metal 27 is taken out from the through-hole 26 to the outside.

With such construction, in case of using the cassette tape, when the cassette tape 24 is charged in the cassette chamber 2, the press metal 27 is pressed from the upper portion, so that the lever 29 is pivoted in the clockwise direction against biased force of the spring 31 as shown in FIG. 13 and the press metal 27 is taken out from the through-hole 26 to the outside.

Accordingly, the recording and reproduction can optionally be performed as before under this state.

Figure 13B:
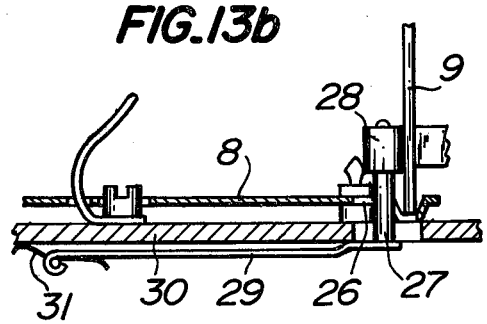

In case of using the magnetic card, the cassette tape 24 is removed from the cassette chamber 2, so that the lever 29 is pivoted in the anti-clockwise direction by means of the spring 31 and the press metal 27 is vertically positioned in the cassette chamber 2 as shown in FIG. 13b.

Thus, the magnetic card 9 is run as being pressed to the surface of the magnetic head 6 with a predetermined pressure by the pad roller 28 of the press metal 27, so that the tape portion 10 of the magnetic card 9 is stably engaged to the head 6, thereby excellently reproducing the recorded content.

Figure 14:
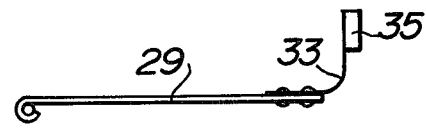
FIGS. 14 and 15 are side views showing different embodiments of the magnetic card press member used in the same embodiment.
Figure 15:
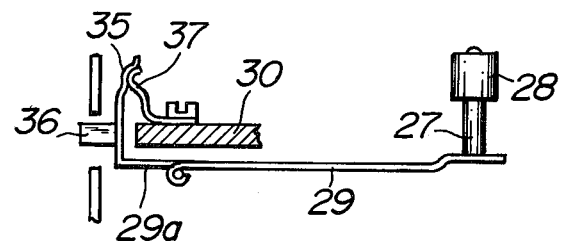

As the pad roller 28 of the above-mentioned press metal 27, use may be made of rubber material besides the soft material such as foamed sponge and the like. In this case, there is required a device for regulating pressure to the surface of the magnetic head 6. Further, instead of the pad roller 28 of the press metal 27, use may be made of a pad material 35 such as felt or teflon secured to the end of the leaf spring 33 as shown in FIG. 14. Further, as shown in FIG. 15, at the other end of the lever 29 is provided an elongated portion 29a having the raised end, a clip groove 35 is formed at the end of this elongated portion 29a, and a projected knob 36 is provided outside the tape recorder body 1 on the way of the elongated portion 29a, while a clip spring 37 corresponding to the said clip groove 35 is provided in the chassis 30, and in case of using as a card reader, the clip groove 35 of the elongated portion 29a of the lever 29 is engaged with the clip spring 37 by the operation of the knob 36 so as to fix the press metal 27.

Figure 16A:
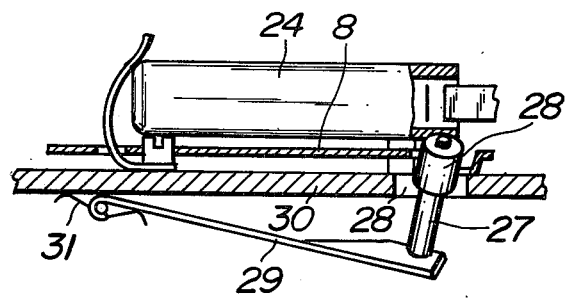
FIGS. 16a and 16b are cross-sections showing another embodiment of the card press member when using the cassette tape and when using the magnetic card.
Figure 16B:
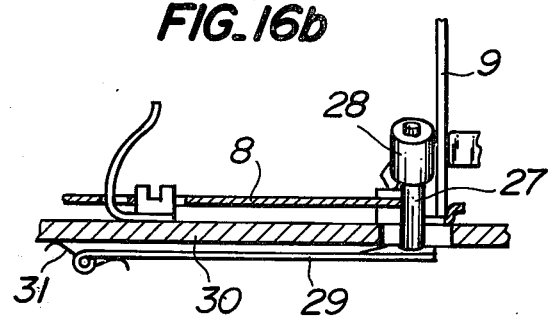
Figure 17:
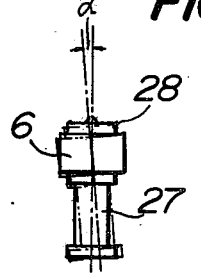
FIG. 17 is a diagram for explaining a relation between the magnetic head and the pad roller in the same embodiment.
Figure 18:
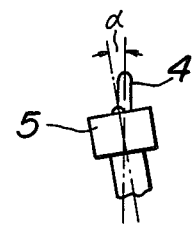
FIG. 18 is a diagram showing the essential part of the other embodiment according to the present invention.

An embodiment of FIG. 16 is to form a slightly twisted portion at one end where the lever 29 shown in FIG. 14 is secured to said press metal 27 and the press metal 27 is inclined by an angle $\alpha$ to the running direction of the card against the surface of the magnetic head 6 as shown in FIG. 17 and the pad roller 28 is pressed to the surface of the magnetic head 6 under this state.

Thus, the magnetic card 9 is pressed to the surface of the magnetic head 6 with a predetermined pressure by means of the pad roller 28 of the press metal 27 and run, but in this case, the downwardly pressing force is acted upon the magnetic card 9 toward the guide groove 7 by the inclination of the pad roller 28. Accordingly, the magnetic card 9 is precisely run along the guide groove 7 without swinging the upper and lower directions, i.e., the orthogonal direction against the surface of the head and the recording content of the tape is excellently reproduced.

In the aforementioned embodiments is shown the case of engaging the pad roller 28 to the surface of the magnetic head 6, but it may be preferable to provide the pad roller 28 at a position apart from the magnetic head 6. Further, it is preferable to provide a plurality of pad rollers 28. Further, when considering the case of exclusive use of the card reader, as shown in FIG. 6, it is preferable to give function of the above-mentioned pad roller to the pinch roller 5 engaged to the capstan shaft 4.

A tape recorder has such construction that the content of a tape is once erased by an erase head at the time of recording and a new content is recorded from a recording head. Therefore, if the above-described magnetic card is erroneously used under the state of this recording, there is the possibility of erasing the recorded content of the magnetic card.

Figure 19A:
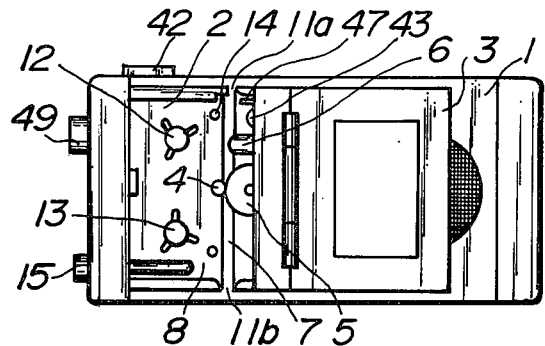
FIGS. 19a and 19b are plan views showing another embodiment of the tape recorder according to the present invention, in the reproducing state and the recording state respectively.
Figure 19B:
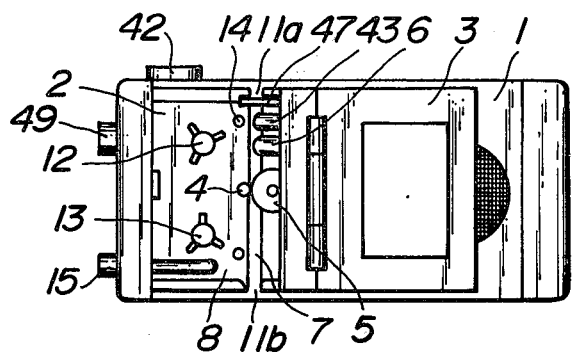
Figure 20A:
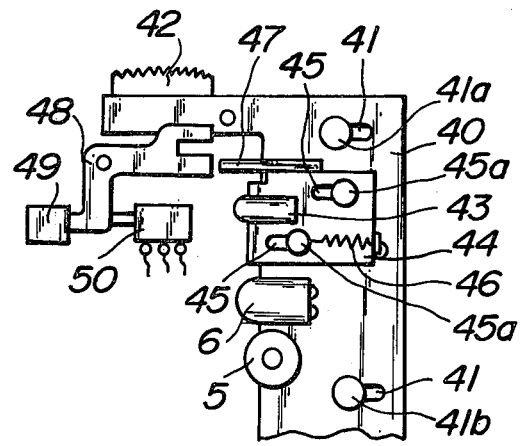
FIGS. 20a and 20b are plan views showing the inside of the tape recorder in the same embodiment, at the time of reproduction and at the time of recording.
Figure 20B:
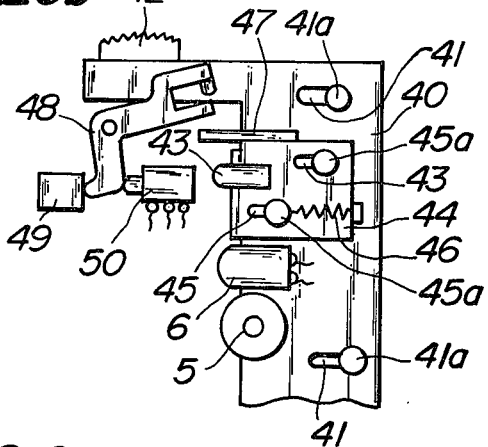

The present invention is constructed as shown in FIGS. 19a, 19b and FIGS. 20a, 20b. In addition, like parts in the other embodiments are denoted by like numerals and no explanation thereof is made. FIGS. 20a and 20b show the inside of the tape reocrder body shown in FIG. 19. In the figure, reference numeral 40 is a sliding plate provided thereon the above-mentioned pinch roller 5 and the magnetic head 6, and on the plate surface of this sliding plate 16 are bored long holes 41, 41 to which are inserted pins 41a, 41a planted on the chassis (not shown) of the tape recorder body 1 and freely moved by interlocking with the operation knob 42 in the direction of these long holes 41, 41. On the sliding plate 40 is provided a base plate 44 secured with an erase head 43 which is further movable in the moving direction. The base plate 44 in this case is provided with bored long holes 45, 45 on its surface, through these long holes 45, 45 is inserted a pin 45a planted on the sliding plate 40, made movable in the direction of the long holes 45, 45 and constantly biased in the right direction as illustrated. On the side surface of the base plate 44 is provided a card limit member 47. This limit member 47 is moved in both directions as illustrated together with the base plate 44, so that it becomes possible to close the card inserting slip 11a of the guide groove 7 when moving in the left direction as illustrated.

On the other hand, numeral 48 is an L-shaped lever which is interlocked with a recording button 49 and moved in the anti-clockwise direction as illustrated. Further, this lever 48 is positioned close to the end of said limit member 47 for limiting the movement of the limit member 47 in the left direction as illustrated when the recording button 49 is not operated. Reference numeral 50 is a recording and reproducing switch for switching a tape reproducing circuit inclusive of an amplifier to a recording circuit in response with the rotation of the said lever 48, i.e., the recording operation.

According to such construction, in case of reproduction operation, if the operation knob 42 is slid from the state shown in FIG. 20a to the left direction as illustrated, the sliding plate 40 is interlocked therewith and moved in the left direction as illustrated. In this case, however, the end of the lever 48 of the card limit member 47 is engaged to the base plate 44, so that the movement in the left direction as illustrated is limited. The pinch roller 5 and the magnetic head 6 are only pushed forward and set in the reproducing state (FIG. 19a). Accordingly, the magnetic card becomes usable under this state.

Next, in case of recording operation, as shown in FIG. 20b, if the recording button 49 is operated, the lever 48 is interlocked therewith and pivoted in the anti-clockwise direction as illustrated. Accordingly, if the operating knob 42 is slid in the left direction as illustrated under this state, the sliding plate 40 is interlocked therewith and moved in the left direction as illustrated, the base plate 44 is also moved in the left direction as illustrated together with the sliding plate 40 by releasing limitation of the lever 48 attached to the end of the card limit member 47. The erase head 43 together with the pinch roller 5 and the magnetic head 6 is pushed forward and set in the recording state (FIG. 19b). Further, in this case, the card inserting slit 11a is closed by the movement of the card limit member 47 is the left direction as illustrated and the magnetic card cannot be used.

Accordingly, in case of recording operation, the magnetic card inserting slid can be closed with the card limit plate, so that the erroneous use of the magnetic card under the recording state can be prevented.

Figure 21:
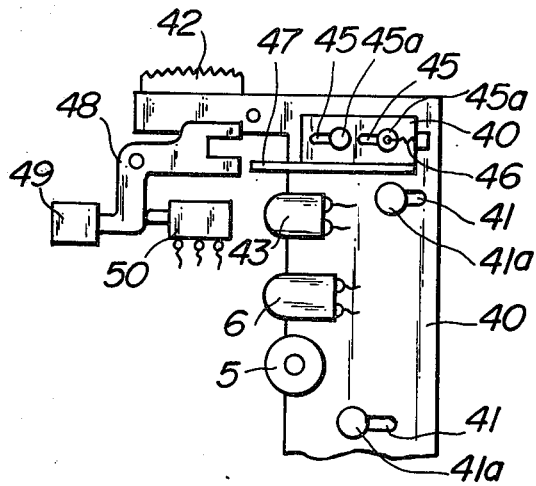
FIG. 21 is a plan view showing the another embodiment of the present invention.

In the aforementioned embodiment is described the case of using a magnet type head for the erase head, but in the case of using a coil-type erase head, as shown in FIG. 21 wherein like numerals are denoted for the like parts in FIG. 20, the erase head 43 is provided on the sliding plate 40, the base plate 44 is only provided with the card limit member 47, and the sliding plate 40 and the base plate 44 become movable by operating the recording button 49, while the erase head 43 is energized by means of the switch 50 for obtaining the same effect as described above.

Figure 22:
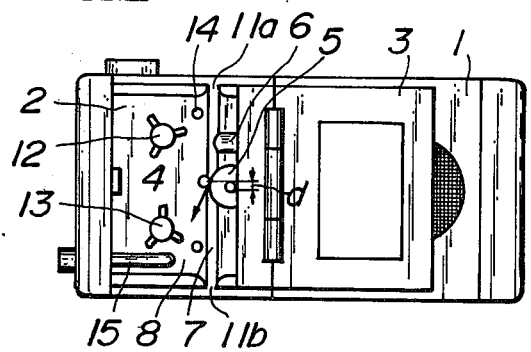
FIG. 22 is a plan view showing another embodiment of the card reader according to the present invention.

Further, as shown in FIG. 22, the capstan shaft 4 and the pinch roller 5 are shifted by a predetermined distance d in the illustrated position, respectively, and running of a tape or card passed therebetween is fed by bending in the arrow direction as illustrated.

Figure 23:
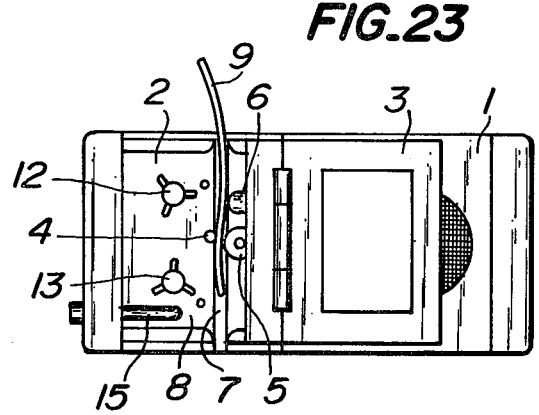
FIG. 23 is a plan view for explaining the function of the same embodiment.

In such a manner, the magnetic card 9 is bent its running direction by the shift of the central position of the capstan shaft 4 and the pinch roller 5 and run under the curved state as a whole as shown in FIG. 23.

Accordingly, the magnetic card 9 can positively be slid on the surface of the magnetic head with a predetermined pressure by its own resilience and reproduction of a tape can be carried out under the constantly stable state.

Figure 24:
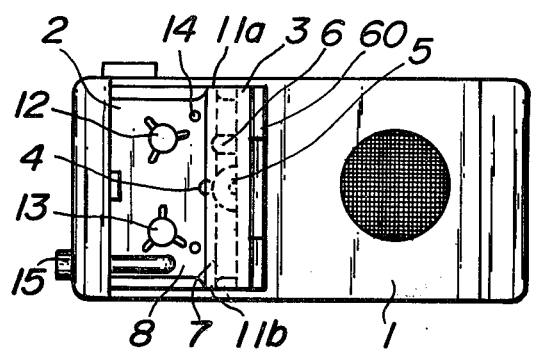
FIGS. 24 and 25 are a plan view and a side view showing another embodiment of the taperecorder according to the present invention.
Figure 25:
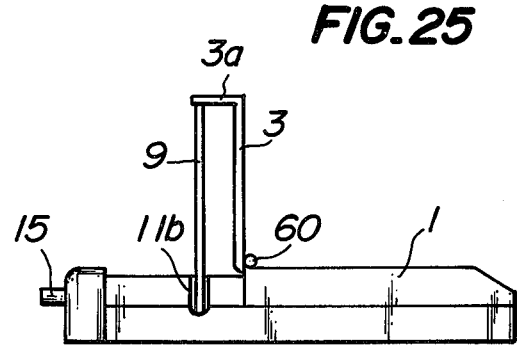

FIGS. 24 and 25 show embodiments of limiting the movement of the magnetic card 9 in the vertical direction by means of the lid 3. The opening of the cassette chamber 2 is provided the lid 3 through a hinge 50. In this case, the hinge 50 is pivoted to the state of standing the lid 3 straight as shown in FIG. 25 and maintains this state. Further, the lid 3 is bent at almost a right angle at the end portion, and between this bent portion 3a and the guide groove 7 which will be explained later on is formed a path for limiting any shaking of the running magnetic card 9 in the upper and lower directions.

In this case, the magnetic card 9 is limited between the bent portion 3a of the lid 3 and the guide groove 7, so that it can positively be run against the surface of the head 6 and reproduction of the tape can be carried out under the constantly stable state.

Thus, according to the present invention, it is possible not only to record and reproduce as a conventional tape recorder but also to reproduce the magnetic card as a card reader, so that it is not necessary to purchase any card reader separately, and this is very advantageous to mitigate an economical burden for users by a large margin. Further, the magnetic card is limited between the bent portion of the lid and the guide groove and run positively on the surface of the head, so that the positive tape reproduction can be obtained and the stable action as a card reader can also be obtained.

Further, the present invention is not limited to the above embodiments, but can be modified within the scope where the essential feature is not changed. For instance, in the above embodiment, the lid 3 is maintained at the vertical state by means of the hinge 60, but if there is a problem in strength, it is preferable to provide an arm for maintaining the lid at the vertical condition. Further, the above embodiment relates to a micro cassette tape recorder, but is applicable to common compact cassette tape recorders.

What is claimed is:

1. A tape recorder comprising:
    a cassette receptacle for charging a cassette tape therein, the receptacle including a head base plate having at least a magnetic head thereon for moving back and forth in a predetermined direction, a tape drive capstan, and a pinch roller for contacting the capstan in accordance with the moving forth of the base plate;
    electrical means for recording and reproducing information;
    a running guide provided in the chamber for guiding a magnetic card, whereby the magnetic card is run along the running guide so as to slidably touch with said magnetic head, said running guide having a guide groove provided on a bottom plate of the receptacle in the running direction of the magnetic card; and
    a tape guide for defining running of a magnetic tape being movably provided on the base plate along the moving path of the magnetic head at a position projected or retracted from the end of the magnetic head near said magnetic head, said positions being selectively switched in accordance with the presence of magnetic tape, and the tape guide not being in contact with the magnetic card at the retracted position.

2. A tape recorder as claimed in claim 1, wherein the position of said tape guide is switched by operating a switch knob.

3. A tape recorder as claimed in claim 1, wherein there is provided a spring member which displaces in accordance with the charging of said cassette tape, and wherein the position of said tape guide can be switched by this spring member.

4. A tape recorder as claimed in claim 1, wherein said running guide is so formed that the magnetic card is curved in running and the magnetic card is slidably touched to the surface of the magnetic head with a predetermined pressure by resilience of the magnetic card.

5. A tape recorder as claimed in claim 4, wherein a tape guide for defining the running of a magnetic tape is movably provided at the position projected or retracted from the end of the magnetic head near said magnetic head, and these positions are selectively switched in accordance with the presence of cassette tape.

6. A tape recorder as claimed in claim 4, wherein the central positions of a capstan shaft and of the pinch roller are shifted by a predetermined distance in the running direction of said magnetic card so as to bend said magnetic card.

7. A tape recorder as claimed in claim 1, wherein a pad roller for pressing said magnetic card to the surface of the magnetic head is detachably provided in said cassette chamber, and said pad roller is arranged by inclining a predetermined angle in the running direction of the magnetic card.

8. A tape recorder as claimed in claim 1, wherein a lid for opening and closing said cassette chamber is made holdable under the vertical state, and movement of the running mangetic card in the widthwise direction between the lid end portion and said running guide is limited.

* * * * *